(12) United States Patent
Clauss et al.

(10) Patent No.: US 7,655,726 B2
(45) Date of Patent: Feb. 2, 2010

(54) THERMOPLASTIC PARTIALLY CRYSTALLINE MOLDING COMPOUND HAVING A REDUCED SURFACE LUSTER AND PRODUCTS MADE THEREFROM

(75) Inventors: Joachim Clauss, Darmstadt-Eberstadt (DE); Christine Kostler, Hofheim (DE); Arnold Schneller, Messel (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 0 days.

(21) Appl. No.: 12/058,124

(22) Filed: Mar. 28, 2008

(65) Prior Publication Data

US 2009/0111932 A1 Apr. 30, 2009

Related U.S. Application Data

(63) Continuation of application No. 10/555,046, filed as application No. PCT/EP2004/004496 on Apr. 28, 2004, now abandoned.

(30) Foreign Application Priority Data

Apr. 30, 2003 (DE) ................ 103 19 745

(51) Int. Cl.
  *C08L 51/04* (2006.01)
(52) U.S. Cl. .............. 525/66; 525/67; 525/68; 525/71; 525/77; 525/78; 525/154; 525/155; 525/166; 525/279; 525/293

(58) Field of Classification Search ............ 525/66, 525/67, 68, 71, 73, 77, 78, 154, 155, 166, 525/279, 293
See application file for complete search history.

(56) References Cited

U.S. PATENT DOCUMENTS

| | | | |
|---|---|---|---|
| 5,340,877 A | 8/1994 | Schleith et al. | |
| 5,475,053 A | 12/1995 | Niessner et al. | |
| 5,821,302 A | 10/1998 | Rosenau et al. | |

FOREIGN PATENT DOCUMENTS

| | | |
|---|---|---|
| DE | 196 30 120 | 1/1998 |
| EP | 0 519 429 | 12/1992 |
| EP | 0 622 416 | 11/1994 |
| EP | 0 769 524 | 4/1997 |

*Primary Examiner*—Bernard Lipman
(74) *Attorney, Agent, or Firm*—Dority & Manning, P.A.

(57) ABSTRACT

The present invention relates to novel molding compositions based on semicrystalline engineering thermoplastics which, in conventional processing techniques, give moldings with reduced surface gloss. A feature of the molding compositions is that they comprise, in a polymer matrix, if appropriate with the usual additives, polymer particles with a median size $d_{50}$ of from 0.1 μm to 100 μm, and comprise at least one other incompatible or semicompatible polymer which has not been chemically crosslinked, and also, if appropriate, comprise salt-like additives. The invention further relates to moldings which are produced by means of conventional processing techniques, in particular via injection molding, from these matt-effect molding compositions.

16 Claims, No Drawings

THERMOPLASTIC PARTIALLY
CRYSTALLINE MOLDING COMPOUND
HAVING A REDUCED SURFACE LUSTER
AND PRODUCTS MADE THEREFROM

RELATED APPLICATIONS

This application is a continuation of Ser. No. 10/555,046 filed Dec. 8, 2005 which is a national stage application (under 35 U.S.C. 371) of PCT/EP2004/004496 filed Apr. 28, 2004 which claims benefit to German application 103 19 745.1 filed Apr. 30, 2003.

The present invention relates to novel molding compositions based on semicrystalline engineering thermoplastics which, in conventional processing techniques, give moldings with reduced surface gloss. The invention further relates to moldings which are produced by means of conventional processing techniques from these matt-effect molding compositions.

Semicrystalline thermoplastics are materials with a long history of use. Alongside the mechanical, thermal, electrical and chemical properties of these materials, optical properties are becoming increasingly important. By way of example, mention may be made of applications in automobile interiors. Here, safety demands that surfaces be dazzle-free. Furthermore, controlled adjustment of mattness is advantageous for aesthetic reasons and in order to achieve high perceived value. Differences in surface gloss are especially noticeable when moldings composed of different materials are processed alongside one another. In many instances this inhibits use of semicrystalline engineering thermoplastics in visible areas.

The prior art and the conventional practice for reduction of surface gloss is the structuring of mold surfaces, e.g. in injection molds. Various techniques are used here to matt the mold surface via an increase in roughness. The structure of the mold surface is reproduced with varying levels of precision on the molded workpiece. However, this approach has only restricted usefulness: firstly different engineering thermoplastics are entirely different in their accuracy of mold reproduction and therefore exhibit different levels of gloss, and secondly matt-effect of the mold is often insufficient to achieve the desired degree of matt-effect, and thirdly the roughness of the mold changes as a function of time by virtue of various wear mechanisms, and together with this the degree of matt-effect of the surface of the molding also changes.

DE 100 229 97 and EP 839867 disclose addition of inorganic chemicals or salts to semicrystalline engineering thermoplastics, with the aim of lowering surface gloss. Other properties of the materials suffer in these instances. Especially mechanical properties, such as toughness and extensibility, are impaired to the extent that these materials are rarely used. Especially when additives are used whose particles have a high aspect ratio, non-uniform surfaces are obtained, often also with visible flow lines.

JP 2002337282, JP 2002294023, and JP 2002212349 disclose addition of particulate polymers with elastomeric phases, with the aim of lowering surface gloss. Other properties of the materials suffer in these instances. Especially mechanical properties, such as stiffness, are impaired. At relatively high contents, these additives tend to form mold deposits on the mold surfaces at the processing temperatures used for semicrystalline engineering thermoplastics. As a function of chemical structure, emission of residue monomers from the particulate polymers is a limiting factor for use in many applications, e.g. in automobile interiors and in household products. Relatively high costs for many particulate polymers represent yet another disadvantage.

The prior art also includes addition of non-crosslinked polymers with the aim of lowering surface gloss. In these instances, too, other properties of the materials suffer. As a function of the conditions of production and of processing, different morphologies often arise, due to incompatibility of matrix polymer and matt-effect polymer. The results are varying matt-effect effects, depending on the respective earlier history, and often poor strain values, and also varying mechanical properties, in particular impact resistances.

The prior art also includes combination of a calcium silicate with a PPO-PEO copolymer (JP 01054053), combination of core-shell polymers with calcium carbonate (JP 3187917), and also combination of core-shell polymers and salts (EP 711807).

Of the formulations published in the prior art, only a few are used for commercially available products. In the case of matrix polymers which are semicrystalline and with this are non-transparent, where matt effects are obtained mainly or exclusively by way of surface roughness, technically satisfactory solutions have hitherto rarely been found. The known molding compositions have a number of disadvantages (impaired mechanical properties, emission of volatile organic chemicals, costs), and the combination of these is responsible for the fact that, despite numerous publications, matt-effect semicrystalline thermoplastics are rarely offered for sale in the European market.

It is therefore an object of the present invention to provide molding compositions which are based on semicrystalline engineering thermoplastics and with which surface gloss can be set with precision via the material, i.e. the intensity of directionally reflected light is controllable, but where the remaining property profile of the engineering thermoplastics does not suffer disproportionately.

Surprisingly, it has now been found that the disadvantages can be avoided to a sufficient extent if matt-effect molding compositions based on semicrystalline engineering thermoplastics (if appropriate with the usual additives) comprise both particulate polymers and polymers which have not been chemically crosslinked. The desired domain size of the polymer particles $d_{50}$ is from 0.01 to 100 μm, preferably from 1 to 50 μm, particularly preferably from 2 to 20 μm. Salts or inorganic chemicals can also be present in the matt-effect molding composition.

The components of the formulation of the inventive molding composition are therefore the matrix (A) comprising semicrystalline engineering thermoplastics, matt-effect particulate polymers (B), matt-effect polymers (C) which have not been chemically crosslinked, and also optionally salts or inorganic chemicals (D) alongside optionally other conventional additives (E).

The components complement one another in a non-trivial manner in promoting phase structures in the matrix of the semicrystalline thermoplastic; in one preferred embodiment of the invention, there is compatibility or partial compatibility between the particulate polymer (B) and the non-crosslinked polymer (C). In another preferred embodiment of the invention, there is incompatibility or partial compatibility between the particulate polymer (B) and the polymer matrix (A). In one particularly preferred embodiment, both conditions are met simultaneously.

The matrix represents from 50 to 99.8% by weight of the inventive molding composition and comprises one or more of the engineering thermoplastics described in the sections below. Because the matrix is defined as semicrystalline, and with this, given that there are domains whose refractive index differs, is non-transparent, components close to the surface make a particular contribution to the matt effect. The mechanism of action of the inventive matting agents is, inter alia, an increase in the roughness of the surface of the molding.

An inventive matrix (A) comprises one or more polymers from the group of the semicrystalline engineering thermoplastics, and also, if appropriate, other thermoplastic polymers as blend constituents (AX). Examples of semicrystalline engineering thermoplastics are polyacetals (A1), polyesters (A2), polyamides (A3), polyaryl sulfides (A4).

Materials which can be used in the matrix are not only strictly linear chain molecules but also branched or slightly crosslinked polymers. The degrees of polymerization are subject to no particular restriction and are of the same order of magnitude as those of comparable molding compositions without matt effect.

Gloss G and mattness M are stated in this application as ratio of light intensity I under the condition that angle of illumination is equal to angle of observation $\Theta_{in} = \Theta_{out}$. The values measured in the examples relate to an angle of incidence and angle of measurement $\Theta$ of 60°.

$$\text{Gloss } G = \frac{I_{directional}}{(I_{directional} + I_{nondirectional})}$$

$$\text{Mattness } M = 1 - G = \frac{I_{nondirectional}}{I_{directional} + I_{nondirectional}}$$

For the purposes of this application, a feature of the molding compositions is that the mattness M of a flat smooth area without the matt-effect additives B, C, and D is lower by 5%, preferably 10%, particularly preferably 75%, than with the matt-effect additives B, C, D. The action of the matting agents can by way of example be determined by comparing mixtures of the matrix with matting agents (individually or in combination) at contents of 5%, 10%, or 15%, with the matrix free from matting agents.

This method also permits demarcation of polymers which function as blend constituents of the matrix (AX) from the polymers (C) which have not been chemically crosslinked and which are used according to the invention as matt-effect additive: the intention is to make use of the fact that component (C) has significant gloss-reducing action on the matrix (A) even without addition of particulate polymers (B). If, in an inventive mixture, a polymer itself which has not been chemically crosslinked significantly lowers the gloss of the matrix, i.e. by at least 5%, it is regarded as component (C); if a non-crosslinked polymer lowers the gloss of the matrix insignificantly, i.e. by less than 5%, it is evaluated as component (AX).

For the purposes of this application, polyacetals (A1) are polymers which, as repeat unit, mainly have oxymethylene groups ($CH_2O$—). They encompass polyoxymethylene homopolymers, polyoxymethylene copolymers, polyoxymethylene terpolymers, and polyoxymethylene block copolymers.

For the purposes of this application, polyesters (A2) are thermoplastic polymers having repeat ester groups in the main chain. Examples are polycondensates of terephthalic acid, of isophthalic acid, of naphthalene dicarboxylic acid, of adipic acid, or of their esters with dihydric alcohols, such as ethylene glycol, butanediol, CHDM, and also with other possible PA, BB, AB comonomers.

For the purposes of this application, polyamides (A3) are thermoplastic polymers having repeat amide groups in the main chain. They encompass not only homopolymers of amine carboxylic acid type but also those of diamine dicarboxylic acid type, and also copolymers with other possible AA, BB, AB comonomers.

For the purposes of this application, polyaryl sulfides (A4) are thermoplastic polymers having repeat sulfur groups in the substantially aromatic main chain. They encompass not only homopolymers but also copolymers.

For the purposes of this application, other thermoplastic polymers as blend constituents (AX) can be other semicrystalline and amorphous polymers.

For the purposes of this application, matt-effect particulate polymers (B) are polymers which are present in the form of particles in the inventive molding composition and whose particulate identity is also substantially retained intact as the process proceeds. In the molding composition, the median particle size $d_{50}$ is from 0.01 μm to 100 μm, preferably from 1 μm to 50 μm, particularly preferably from 2 μm to 20 μm. For the purposes of this application, particulate polymers comprise one or more of the following classes of polymer: emulsion polymers (B1), suspension polymers (B2), precipitation polymers (B3), comminuted crosslinked elastomers (84), comminuted thermoplastics which soften only on reaching high temperatures (B5), thermoplastic elastomers in particle form (B6). Particulate polymers may have one or more phases. Particulate polymers can be present with and without elastomeric phases. Particulate polymers may (B1-B6) have been physically crosslinked or chemically crosslinked or (B5) may not have been crosslinked.

For the purposes of this application, emulsion polymers (B1) are preferably acrylate (co)polymers and multiphase (co)polymers.

Emulsion polymerization reactions are carried out in the presence of surfactants. These can be non-ionic or ionic (preferably anionic) surfactants. Examples of non-ionic surfactants are ether surfactants (e.g. polyoxyethylene nonylphenyl ether, polyoxyethylene stearyl ether, polyoxyethylene lauryl ether), ester surfactants (e.g. polyoxyethylene monostearate, polyoxyethylenesorbitan monolaurate) and block copolymer surfactants (e.g. polyoxyethylene-polyoxypropylene block copolymer). Examples of ionic surfactants encompass anionic surfactants (e.g. soaps, alkanesulfonates, alkylarylsulfonates) and cationic surfactants (e.g. straight-chain and cyclic ammonium compounds, quaternary ammonium salts).

The usual water-soluble polymerization initiators are also used.

Acrylate (co)polymers which are prepared from emulsion may comprise the following monomers: alkyl acrylates having a $C_2$-$C_8$-alkyl group (e.g. ethyl acrylate, propyl acrylate, butyl acrylate, cyclohexyl acrylate, 2-ethyl acrylate), alkyl methacrylates (e.g. methyl methacrylate and butyl methacrylate), and also, if appropriate, as crosslinking comonomers, conjugated dienes, aromatic divinyl monomers (e.g. divinylbenzene), alkanepolyole poly(meth)acrylates (e.g. ethylene glycol diacrylate, ethylene glycol dimethacrylate, butyl glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate), and also other suitable comonomers. These acrylate (co)polymers are commercially available from emulsion. Preparation processes are known from the prior art.

Multiphase (co)polymers are composed of a polymer core (preferably of a soft elastomer) and of one or more shells, of which one (preferably the outermost) comprises a hard glassy amorphous polymer. These multiphase (co)polymers are commercially available. Preparation processes are known in the prior art.

Examples of monomers which can be used to form this type of elastomeric polymer core are conjugated dienes (e.g. butadiene, isoprene, chloroprene), alkyl acrylates having a $C_2$-$C_8$-alkyl group (e.g. ethyl acrylate, propyl acrylate, butyl acrylate, cyclohexyl acrylate, 2-ethyl acrylate), and mixtures which comprise the comonomers and the monomers mentioned (e.g.: styrene; vinyltoluene, a-methylstyrene, aromatic vinylidenes, vinyl cyanides, such as acrylonitrile and methacrylonitrile, vinylidene cyanide, and alkyl methacrylates, such as methyl methacrylate and butyl methacrylate). Very small proportions of polyfunctional crosslinking or branching monomers can also be used. Examples of crosslinking monomers are conjugated dienes (see above), aromatic divinyl monomers (e.g. divinylbenzene), alkanepolyole poly(meth)acrylates (e.g. ethylene glycol diacrylate, ethylene glycol dimethacrylate, butyl glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate). Examples of branching monomers are allyl esters of unsaturated carboxylic acids (e.g. allyl acrylate, allyl methacrylate, diallyl maleate, diallyl fumarate, diallyl itaconate). In one preferred embodiment, the soft elastomeric polymer core has a glass transition temperature below −20° C.

The proportion by weight of the soft elastomeric core can be from 0 to 90% by weight of the entire core-shell polymer.

The glass transition temperature of the hard glassy amorphous shell is preferably above 40° C. The shell can comprise oxygen-containing vinyl monomers, such as (meth)acrylates of alcohols, if appropriate with further hydroxy groups or further glycidyl groups (e.g. methyl (meth)acrylate, ethyl (meth)acrylate, butyl (meth)acrylate, hydroxyethyl (meth)acrylate, hydroxypropyl (meth)acrylate, glycidyl (meth)acrylate), or else aromatic vinyl monomers (e.g. styrene, vinyltoluene, vinyl cyanides, such as acrylonitrile of methacrylonitrile, vinylidene cyanide). The hard shell, too, can comprise proportions of polyfunctional crosslinking or branching monomers.

The proportion by weight of the hard glassy amorphous shell can be from 10 to 100% by weight of the entire core-shell polymer. The shell can surround the core entirely or cover it only partially. The intermediate phases can lie spatially between the core and the shell, or can have been dispersed in one of the two phases.

One or more intermediate phases can lie between the core produced in the first polymerization step and the shell produced in the final polymerization step. These intermediate phases can comprise, as a function of the desired property profile, selected monomers listed above for core and shell, and can be counted with the proportion by weight of the core or of the shell, the total thus being 100% by weight.

For the purposes of this application, suspension polymers (B2) are preferably acrylate (co)polymers.

Suspension polymerization reactions are carried out in the presence of surface stabilizers. By way of example, these can be sparingly soluble inorganic substances, such as bentonite. The usual monomer-soluble polymerization initiators are also used.

Acrylate (co)polymers prepared from suspension can comprise the following monomers: alkyl acrylates having a $C_2$-$C_8$-alkyl group (e.g. ethyl acrylate, propyl acrylate, butyl acrylate, cyclohexyl acrylate, 2-ethyl acrylate), alkyl methacrylates (e.g. methyl methacrylate and butyl methacrylate), and also, if appropriate, as crosslinking comonomers, conjugated dienes, aromatic divinyl monomers (e.g. divinylbenzene), alkanepolyole poly(meth)acrylates (e.g. ethylene glycol diacrylate, ethylene glycol dimethacrylate, butyl glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate), and also other suitable comonomers. Preparation processes are known from the prior art.

For the purposes of this application, comminuted thermoplastics (B5) which soften only on reaching high temperatures preferably have, when compared with the matrix (A), higher melt viscosity under processing conditions and/or higher melting point and/or higher softening point. Examples here are PPS, $PPSO_2$, PET, PEI, PES.

For the purposes of this application, matt-effect thermoplastics (C) which have not been chemically crosslinked are polymers which significantly lower the surface gloss of the matrix even in the absence of the particulate polymers (B). This generally means that the matt-effect polymer (C) and the matrix (A) are not completely compatible, and that separation structures are formed. Matt-effect polymers which have not been chemically crosslinked can be amorphous or semicrystalline; they can be homopolymers or comprise comonomers; they can be multiphase materials; they can be applied in particulate form as long as they lose their particulate identity under the conditions of processing, i.e. as long as the particles undergo breakdown or deformation, or agglomerate to give solid domains. For the purposes of this application, matt-effect non-crosslinked polymers (C) can also be acrylate (co) polymers.

Inorganic and salt-like compounds (D) are an optional constituent of the inventive thermoplastic molding compositions. Among the large number of compounds, suitable compounds are those which, under the conditions of processing within the melt of the semicrystalline thermoplastic, do not dissolve but are present in particle form. Among these are firstly the oxides and mixed oxides (D1) of the 3rd-5th period of main group III-IV, the 4th-5th period of transition group III-VIII, and of the lanthanides, in particular the oxides of Si, Ti, Al. This encompasses silicates, aluminosilicates, and silicatic minerals. By way of example, mention may be made of wollastonite, kaolinite, mica, talc, and clays. Other examples which may be mentioned are beads and fibers composed of A glass and of E glass. Among these materials are also salt-like compounds (D2) (carbonates, sulfates, phosphates, sulfides and carboxylates) of the alkaline earth metals, of zinc, of aluminum, and of tin, and also of the metals of transition group VIII of the Periodic Table of the Elements. Examples which may be mentioned and have proven successful in practice are calcium carbonate, calcium stearate, zinc carbonate, zinc acetate, and zinc stearate. In the molding composition, the median particle size $d_{50}$ is from 0.001 μm to 100 μm, preferably from 1 μm to 50 μm, particularly preferably from 2 μm to 20 μm. The compounds (D) can inter alia contribute to the matt effect of the molding composition.

For the purposes of this application, other conventional additives (E) are stabilizers for improving resistance to exposure to light, UV radiation, and weathering (E1), stabilizers for improving thermal and thermo-oxidative stability (E2), stabilizers for improving hydrolytic resistance (E3), stabilizers for improving acidolytic resistance (E4), lubricants (E5), mold-release agents (E6), colorant additives (E7), crystallization-regulating substances and nucleating agents (E8), and, if appropriate, other conventional additives (E9).

The inventive molding composition can comprise, as stabilizers relevant to weathering and light and UV radiation (E1), one or more substances from the group of (E1A) benzotriazole derivatives, (E1B) benzophenone derivatives, (E1C) oxanilide derivatives, (E1D) aromatic benzoates; (E1E) cyanoacrylates, and (E1F) sterically hindered amines. In one preferred embodiment, the invention comprises not only the type (E1A)-(E1E) but also hindered amines E1F. In one particularly preferred embodiment, a benzotriazole derivative E1A is used together with a hindered amine (E1F). Examples of (E1A) benzotriazole derivatives are 2-[2'-hydroxy-3',5'-bis(1,1-dimethylbenzyl)phenyl]benzotriazole, 2-[2'-hydroxy-3'-tert-butyl-5'-methyl-phenyl-5-chlorobenzotriazole, 2-(2'-hydroxy-5'-methylphenyl)benzotriazole. Examples of benzophenone derivatives (E1B) are 2-hydroxy-4-n-octoxybenzophenone, 2-hydroxy-4-n-dodecyloxybenzophenone, (E1F). Examples of sterically hindered amines are 2,2,6,6-tetramethyl-4-piperidyl compounds, e.g. bis(2,2,6,6-tetramethyl-4-piperidyl) sebacate or the polymer composed of dimethyl succinate and 1-(2-hydroxyethyl)-4-hydroxy-2,2,6,6-tetramethyl-4-piperidine.

Advantageous proportions used of the weathering stabilizers (E1) mentioned are from 0.01 to 2.0% by weight. Total E1A-E1F contents of from 0.02 to 1.0% by weight are particularly preferred.

The inventive molding composition can comprise, as stabilizers for improving thermal and thermo-oxidative stability (E2), antioxidants (E2), e.g. one or more substances from the group of (E2A) sterically hindered phenols, (E2B) phenol ethers, (E2C) phenol esters of organic or phosphorus-containing acids, e.g. pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxy-phenyl)propionohydrazide], hexamethylene glycol bis[3-(3,5-di-tert-butyl-4-hydroxyphenyl)propionate], 3,5-di-tert-butyl-4-hydroxytoluene. Preference is given to pentaerythrityl tetrakis[3-(3,5-di-tert-butyl-4-hydroxy-phenyl)propionate].

Proportions that may be used of the antioxidants (E2) mentioned are from 0.01 to 10% by weight. Total contents up to 2% by weight are preferred. At smaller amounts, the stabilizing effect is not always provided.

The inventive molding composition can comprise, as stabilizers for improving hydrolytic resistance, hydrolysis stabilizers (E3), i.e. one or more substances form the group of the glycidyl ethers. Examples are mono-, di- or, if appropriate, polyglycidyl ethers of ethylene glycol, propanediol, 1,4-butanediol, 1,3-butanediol, glycerol, and trimethylolpropane trisglycidyl ether.

Proportions that may be used of the stabilizers (E3) mentioned are from 0 to 3% by weight. Total contents up to 1.0% by weight are preferred.

The inventive molding composition can comprise, as stabilizers for improving acidolytic resistance (E4), acid-abstracting substances, i.e. one or more substances from the group of the nitrogen-containing compounds (E4A), alkaline earth metal compounds (E4B), or bases (E4C). If the matrix comprises polyacetals or similarly acid-labile polymers, in one preferred embodiment both nitrogen-containing compounds (E4A) and alkaline earth metal compounds (E48) are used. Examples of nitrogen-containing compounds (E4A) are melamine, melamine-formaldehyde adducts, and methylolmelamine. Examples of alkaline earth metal compounds (E4B) are calcium propionate, tricalcium citrate, and magnesium stearate. Examples of bases (E4C) are $Na_2CO_3$ and $NaHCO_3$.

Preferred proportions used of the acid scavengers (E4) mentioned are from 0.001 to 1.0% by weight. Acid scavengers can also be used in the form of mixtures.

The inventive molding composition can comprise, as lubricants (E5) or mold-release agents (E6), waxes, e.g. polyethylene waxes and/or oxidized polyethylene waxes, their esters and amides, or else fatty acid esters or fatty acid amides. Preference is given to mixed ethylenebis(fatty acid amides) and montan wax glycerides.

Preferred proportions used of lubricants (E5) and mold-release agents (E6) are from 0.01 to 10% by weight. Total contents of from 0.05 to 3% by weight are preferred.

Lubricants can also act as mold-release agents, and vice versa.

The inventive molding composition can comprise, as colorant additives (E7), colorant substances, known as (E7) colorants. These can be either organic or inorganic pigments, or else dyes. There is no particular restriction on the pigments and dyes, but pigments which do not become dispersed uniformly in the molding composition but become concentrated at interfaces or at individual domains often prove to give poor uniformity of color, consistency of color, and mechanical properties. By way of example, mention may be made of anthraquinone dyes and various pigments, such as carbon black, azo pigments, phthalocyanine pigments, perylene pigments, quinacridone pigments, anthraquinone pigments, indoline pigments, titanium dioxide pigments, iron oxide pigments, and cobalt pigments. Within the present invention it is also possible to use any desired suitable combination of colorant substances.

If carbon blacks are used, they are often found to contribute to weathering resistance as well as acting as colorants.

The total content of colorant substances is preferably from 0.05 to 10% by weight, particularly preferably up to 5% by weight. At excessively low contents, the desired depth of color is often not achieved; higher contents are mostly not necessary, and are economically unattractive, and sometimes impair other properties, such as the mechanical properties of the molding composition.

The inventive molding composition can comprise, as crystallization-regulating substances (E8), nucleating agents having homogeneous or heterogeneous action, i.e. one or more substances from the group of solid inorganic chemicals, or crosslinked polymers. Examples of (E8) nucleating agents are valentinite, pyrophyllite, dolomite, melamine cyanurate, boron compounds, such as boron nitride, silica, montmorillonite, and organic modified montmorillonite, organic and inorganic pigments, melamine formaldehyde condensates, and phyllosilicates. In one preferred embodiment, the invention comprises talc as nucleating agent.

The preferred proportions used of nucleating agents are from 0.0001 to 5% by weight. Total contents of from 0.001 to 2.0% by weight are preferred.

The inventive molding composition can comprise, as further additives (E9), additives which according to the respective prior art provide or improve functional properties of the molding composition (e.g. electrical conductivity, antistatic performance, etc.).

The inventive molding composition can be prepared by a known process in known assemblies: the components are mixed with one another, altogether or in a suitable sequence, and extruded in the form of pelletized material. The pelletized material can be further processed in a known manner, e.g. via extrusion, injection molding, vacuum forming, blow molding, or foaming, to give moldings.

The stabilizers and further additives mentioned for the purposes of this application can be added during any desired suitable steps. The final formulation of the molding composition can also be produced in such a way that individual or combinations of additives are added only shortly prior to production of the molding. Other suitable processes are the mixing of pelletized material with an additive paste or the mixing of two or more types of pelletized material, in such a way that at least one pelletized material corresponds to the inventive molding composition, or that together they finally give the inventive composition.

An example of a preferred preparation procedure is the mixing of all of the constituents at an elevated temperature, i.e. above the melting point of all of the matrix polymers (A) in assemblies with good mixing action, e.g. brabenders or extruders, preferably twin-screw extruders, or on mixing rolls.

Another preferred preparation procedure is the mixing of all of the components at room temperature and the subsequent melting of the matrix polymers in an extruder, preferably a twin-screw extruder.

It is equally possible for the components individually or in combination first to be processed to give relatively high-concentration masterbatches, and for these then to be further processed with further components to give the inventive mixture.

The inventive molding composition is thermoplastic and therefore accessible to the usual processing procedures, and can be processed to give any desired moldings. It is a suitable engineering material for production of semifinished products and of finished parts. In particular, it is suitable for use in the sector of household devices and in automobiles, including automobile interiors, and for automobile accessories.

The inventive molding composition achieves matt moldings, given suitable processing conditions, even on highly polished glossy mold surfaces.

However, molds with structured surfaces have been widely used in recent years. This method can produce moldings with a very wide variety of textures. Possible effects are irregular graining, leather-imitation textures, and technical graining based on regular patterns. Various roughnesses can be generated here. Multiple-gloss-level graining in which the mold surface has two or more locally different roughnesses is also known. The structuring of the mold surface can be the result of the usual methods, e.g. electrolytic deposition, mechanical treatment, sandblasting, or chemical or plasma etching. The inventive molding composition also achieves matt moldings on structured mold surfaces, given suitable processing conditions.

The present invention also provides moldings which are produced from the inventive molding composition by means of conventional processing techniques, in particular via injection molding. Moldings also explicitly included are those whose production in conventional assemblies involves deviation from conventional processing parameters in order to set a suitable degree of matting.

EXAMPLES

Mixing in an extruder was used to prepare study specimens which comprise polyoxymethylene (POM) as semicrystalline engineering thermoplastic (component A), and also study specimens which comprise polybutylene terephthalate (PBT) as semicrystalline engineering thermoplastic. The inventive examples comprise not only component A but also a particulate matting agent (component B), and also a non-crosslinked thermoplastic polymer (component C). In contrast, the specimens utilized as comparative examples comprise either a particulate matting agent (component B) or a non-crosslinked thermoplastic polymer (component C).

The table below lists the constitutions of the specimens.

If the example comprises the entry POM as component A, Hostaform C27021 having polyoxymethylene 5.6% of dioxolane as comonomer was used as matrix polymer. Conventional additives $E_{POM}$ used comprised Irganox 1010 antioxidant, Tinuvin 234 and Tinuvin 770 light stabilizers, Licowax C flow aid and mold-release agent, melamine and calcium propionate as acid abstractors, and carbon black as colorant additive.

If the example comprises the entry PBT as component A, Celanex 2500 10/0242 PBT was used as matrix. Conventional additives $E_{PBT}$ used comprised Irganox 1010 and Irgafos 126 antioxidants, talc as nucleating agent, Licolub WE4 flow aid and mold-release agent, and carbon black as acid abstractors and as colorant additive.

If the example comprises the entry EMUL1 as component B, the particulate matting agent used comprised an acrylate copolymer prepared by way of emulsion: Paraloid 5136 from Rohm & Haas, and in the case of SUS an acrylate copolymer prepared by way of suspension, with particle sizes of from 8 to 18 μm (based on PBMA and PMMA) was used, and in the case of PET comminuted PET whose $d_{50}$ is 5 μm was used, and in the case of EMUL2 a multiphase copolymer prepared by way of emulsion: MBX-8 from Sekisui (having a crosslinked PBMA core and PMMA shell) whose $d_{50}$ is 8 μm was used.

If the example comprises the entry T1 as component C, the non-crosslinked thermoplastic used comprised Paraloid $K_{125}$ from Rohm & Haas (spray-dried acrylate copolymer), and in the case of T2 Degalon VH1 from Degussa Röhm (spray-dried acrylate copolymer) was used.

If the example comprises the entry $CaCO_3$ as component D, Omyacarb BLP2 calcium carbonate from Omya whose $d_{50}$ is 5.5 μm was used.

To determine mattness, plaques measuring 60×60×2 mm were injection molded in a Krauss-Maffei KM 125-390 C2 machine. The following parameters were used here: melt temperature in the case of POM from 180 to 205° C., melt temperature in the case of PBT from 240 to 245° C., mold wall temperature in the case of POM 60° C., mold wall temperature in the case of PBT from 60 to 75° C., fill velocity from 20 to 25 mm/s; hold pressure from 400 to 600 bar. The degree of gloss was measured using a Byk Gardner micro-Tri-gloss at an angle of 60° to ISO 2813. Mattness was calculated in accordance with the above equation. The results are listed in the table.

To determine mechanical properties, DIN-ISO tensile specimens of dimensions 172×10×4 mm were injection molded in a Krauss-Maffei KM 125-390 C2 machine. The following parameters were used here: melt temperature in the case of POM from 180 to 205° C., melt temperature in the case of PBT from 240 to 245° C., mold wall temperature in the case of POM 60° C., mold wall temperature in the case of PBT from 60 to 75° C., fill velocity from 20 to 25 mm/s, hold pressure from 400 to 600 bar. Tensile modulus of elasticity and yield stress to ISO 527 were determined after 24 h. The results are listed in the table.

To determine the emission values of POM, plaques of dimensions 80×60×1 mm were injection-molded in a Krauss-Maffei KM 120/340B machine. The following parameters were used here: melt temperature in the case of POM 195° C., mold wall temperature in the case of POM 85° C., flow front velocity 200 mm/s, hold pressure 900 bar. The test specimens were stored for 24 h in a cabinet under standard conditions at 23° C. and 50% relative humidity. Formaldehyde emission was then determined to VDA-275. For further determination of the emission values of POM and PBT, pelletized material was stored for 24 h in a cabinet under standard conditions at 23° C. and 50% relative humidity. Total carbon emission was then determined to VDA-277. The results are listed in the table.

If the example has been evaluated as "good" in the mattness column, mattness values >80% were measured on polished mold surfaces. If the example has been evaluated as "adequate" in the mattness column, mattness values in the range from 60 to 80% were measured on polished mold surfaces. If the example has been evaluated as "poor" in the mattness column, mattness values <60% were measured on polished mold surfaces, or aesthetic surface defects were found.

If the example has been evaluated as "good" in the emission column, total VDA-275 and VDA-277 volatile contents measured were <100 ppm. If the example has been evaluated as "adequate" in the emission column, total VDA-275 and VDA-277 volatile contents measured were from 100 ppm to 150 ppm. If the example has been evaluated as "poor" in the emission column, total VDA-275 and VDA-277 volatile contents measured were <150 ppm.

If the example has been evaluated as "good" in the mechanical properties column, moduli of elasticity >2350 MPa and yield stresses >50 MPa were determined on the tensile specimens. If the example has been evaluated as "poor" in the mechanical properties column, moduli of elasticity <2000 MPa were determined on the tensile specimens. If the example has been evaluated as "adequate" in the mechanical properties column, moduli of elasticity of from 2000 to 2350 MPa or yield stresses <50 MPa were determined.

The table shows that the inventive molding compositions exhibit good values for mattness throughout. They exhibit very low emission values and, setting aside one example, which nevertheless exhibits adequate mechanical properties, moduli of elasticity >2350 MPa and yield stresses >50 MPa were determined for all of the other examples.

In contrast, the comparative examples exhibit a property profile which is considerably less uniform. In the case of good mattness, at least the emission value or the mechanical properties are in the "poor" range, or at least both are in the adequate range. However, the values for mattness are also "adequate" or "poor" in the case of many of the comparative specimens.

TABLE

| Example | | Component (A) in % by wt | A | Component (B) in % by wt. | B | Component (C) in % by wt. | C | Component (E) in % by wt. | D | Component (A) in % by wt. | E | Mattness | Emission | Mech. Properties |
|---|---|---|---|---|---|---|---|---|---|---|---|---|---|---|
| 1 | Comp. ex. | 98.55 | POM | | | | | | | 1.45 | $E_{POM}$ | "poor" | "good" | "good" |
| 2 | Comp. ex. | 88.65 | POM | 10.00 | EMUL1 | | | | | 1.35 | $E_{POM}$ | "adeq." | "poor" | "adeq." |
| 3 | Comp. ex. | 78.75 | POM | 20.00 | EMUL1 | | | | | 1.25 | $E_{POM}$ | "good" | "poor" | "poor" |
| 4 | Comp. ex. | 93.60 | POM | | | 5.00 | T1 | | | 1.40 | $E_{POM}$ | "poor" | "good" | "good" |
| 5 | Comp. ex. | 88.65 | POM | | | 10.00 | T1 | | | 1.35 | $E_{POM}$ | "adeq." | "good" | "good" |
| 6 | Comp. ex. | 78.75 | POM | | | 20.00 | T1 | | | 1.25 | $E_{POM}$ | "good" | "adeq." | "adeq." |
| 7 | Comp. ex. | 88.65 | POM | | | | | 10.00 | $CaCO_3$ | 1.35 | $E_{POM}$ | "poor" | "good" | "adeq." |
| 8 | Inv. | 86.65 | POM | 4.00 | | 8.00 | | | | 1.35 | $E_{POM}$ | "good" | "good" | "good" |
| 9 | Inv. | 84.65 | POM | 7.00 | | 7.00 | | | | 1.35 | $E_{POM}$ | "good" | "good" | "good" |
| 10 | Inv. | 84.70 | POM | 4.00 | | 8.00 | | 2.00 | $CaCO_3$ | 1.30 | $E_{POM}$ | "good" | "good" | "good" |
| 11 | Inv. | 83.70 | POM | 10.00 | SUS | 5.00 | T1 | | | 1.30 | $E_{POM}$ | "good" | "good" | "good" |
| 12 | Inv. | 83.70 | POM | 5.00 | EMUL2 | 10.00 | T2 | | | 1.30 | $E_{POM}$ | "good" | "good" | "good" |
| 13 | Inv. | 83.70 | POM | 5.00 | PET | 10.00 | T2 | | | 1.30 | $E_{POM}$ | "good" | "good" | "good" |
| 14 | Comp. ex. | 99.10 | PBT | | | | | | | 0.90 | $E_{PBT}$ | "poor" | "good" | "poor" |
| 15 | Comp. ex. | 89.15 | PBT | 10.00 | EMUL1 | | | | | 0.85 | $E_{PBT}$ | "adeq." | "adeq." | "poor" |
| 16 | Comp. ex. | 89.15 | PBT | 10.00 | SUS | | | | | 0.85 | $E_{PBT}$ | "adeq." | "good" | "adeq." |
| 17 | Comp. ex. | 89.15 | PBT | | | 10.00 | T1 | | | 0.85 | $E_{PBT}$ | "adeq." | "good" | "adeq." |
| 18 | Comp. ex. | 89.15 | PBT | | | 10.00 | T2 | | | 0.85 | $E_{PBT}$ | "adeq." | "good" | "adeq." |
| 19 | Inv. | 89.15 | PBT | 5.00 | EMUL1 | 5.00 | T1 | | | 0.85 | $E_{PBT}$ | "good" | "good" | "good" |
| 20 | Inv. | 84.25 | PBT | 5.00 | EMUL1 | 5.00 | T2 | 5.00 | $CaCO_3$ | 0.75 | $E_{PBT}$ | "good" | "good" | "adeq." |

The invention claimed is:

1. A molding composition for production of moldings with reduced surface gloss, which has
   a) from 50 to 99.8% by weight of a matrix (A) comprising one or more semicrystalline engineering thermoplastics selected from the group consisting of polyacetals, polyesters, polyamides and polyaryl sulfides,
   b) from 0.1 to 30% by weight of one or more particulate polymers (B) with a median size $d_{50}$ of from 0.01 µm to 100 µm,
   c) from 0.1 to 30% by weight of one or more non-crosslinked thermoplastic polymers (C) which themselves reduce the gloss of the matrix (A) by at least 5%, and
   d) from 0 to 20% by weight of one or more inorganic or salt-like compounds (D) with a median size $d_{50}$ of from 0.001 µm to 100 µm,
   wherein a molding produced from the molding composition comprises total formaldehyde and carbon emission values of less than 150 ppm and a moduli of elasticity greater than 2000 MPa, and wherein the mattness value of a comparison molding produced without components B, C, and D is at least 60% lower than a molding produced from the molding composition.

2. The molding composition as claimed in claim 1, further comprising
   e) from 0 to 20% by weight of additives (E).

3. The molding composition as claimed in claim 1, wherein the semicrystalline matrix additionally comprises other thermoplastic polymers as blend constituents.

4. The molding composition as claimed in claim 1, wherein the semicrystalline matrix comprises, as engineering thermoplastic, polyoxymethylene or a copolyoxymethylene.

5. The molding composition as claimed in claim 1, wherein the semicrystalline matrix comprises, as engineering thermoplastic, a polyester.

6. The molding composition as claimed in claim 1, wherein the particulate polymer(s) (B) have been selected from the group which consists of emulsion polymers (B1), suspension polymers (B2), precipitation polymers (B3), comminuted crosslinked elastomers (B4), comminuted thermoplastics which soften only at high temperatures (B5), and thermoplastic elastomers in particle form (B6).

7. The molding composition as claimed in claim 1, wherein the non-crosslinked thermoplastic polymer(s) (C) are acrylate (co)polymers.

8. The molding composition as claimed in claim 6, wherein the size of the particulate polymers is from 1 µm to 50 µm.

9. A molding with reduced surface gloss, which has been produced by processing methods from a molding composition as claimed in claim 1.

10. The molding composition as claimed in claim 6, wherein the size of the particulate polymers is from 2 µm to 20 µm.

11. The molding composition as claimed in claim 1, wherein a comparison molding produced without components B, C, and D has a mattness value at least 75% lower than a molding produced from the molding composition.

12. The molding composition as claimed in claim 1, wherein a comparison molding produced without components B, C, and D has a mattness value at least 80% lower than a molding produced from the molding composition.

13. The molding composition as claimed in claim 1, wherein a molding produced from the molding composition comprises total formaldehyde and carbon emission values of less than 100 ppm.

14. The molding composition as claimed in claim 1, wherein a molding produced from the molding composition comprises a moduli of elasticity greater than 2350 MPa.

15. The molding composition as claimed in claim 1, wherein a molding produced from the molding composition comprises a yield stress greater than 50 MPa.

16. A molding composition for production of moldings with reduced surface gloss, which has
   a) from 50 to 99.8% by weight of a matrix (A) comprising a polyacetal semicrystalline engineering thermoplastic,
   b) from 0.1 to 30% by weight of one or more particulate polymers (B) with a median size $d_{50}$ of from 1 µm to 50 µm,
   c) from 0.1 to 30% by weight of non-crosslinked acrylate (co)polymers, and
   d) from 0 to 20% by weight of one or more inorganic or salt-like compounds (D) with a median size $d_{50}$ of from 0.001 µm to 100 µm;
   wherein a molding produced from the molding composition comprises total formaldehyde and carbon emission values of less than 100 ppm and a moduli of elasticity greater than 2350 MPa, and wherein the mattness value of a comparison molding produced without components B, C, and D is at least 60% lower than a molding produced from the molding composition.

* * * * *